3,755,513
PRODUCTION OF POROUS UO₂ CONTAINING CERAMIC OXIDE FUEL
Wolfgang Stoll and Hartmut Kroll, Hanau am Main, Germany, assignors to NUKEM/Nuklear-Chemie und-Metallurgie, GmbH, Wolfgang near Hanau am Main, Germany
No Drawing. Filed Sept. 8, 1969, Ser. No. 856,192
Claims priority, application Germany, Jan. 15, 1969 P 19 01 788.0
Int. Cl. G21c 21/02
U.S. Cl. 264—0.5         12 Claims

ABSTRACT OF THE DISCLOSURE

Ceramic oxide sintered materials are prepared from uranium dioxide or mixtures containing uranium dioxide as the primary component by dry mixing a powder of thermally decomposable compounds of definite particle distribution at temperatures up to 600° C. with uranium dioxide, plutonium dioxide or thorium dioxide or mixtures of these oxides and finally without dewaxing treatment are further worked to molded and sintered products of lower density. The preferred additive is ammonium uranyl carbonate.

---

The present invention relates to a process for the production of ceramic oxide fuel and breeder materials of lower density.

It is known to form oxides from uranium with various degrees of U–235 enrichment or from thorium or plutonium in various isotope compositions or oxide mixtures of the above-named elements which are the preferred fuel or breeder materials of most of today's nuclear reactors. The oxides of these elements are produced primarily in the form of cylindrical sintered bodies in which according to the physical requirements of the reactor the sintered materials necessarily have a higher density (>92% of theoretical density) or a lower density (<92% of theoretical density).

Several methods are known to produce sintered bodies of lower density (<92% theoretical density) which also contain >8% by volume scarcely shrinking pores. For example, the sinterability of the oxides or mixtures of the oxide can be reduced by additional heat treatment so that it can be transformed into sintered bodies of lower density. A disadvantage of this process is the additional cost of the heat treatment.

A further known process consists in the manufacture of hard granules from the oxide powder or powder mixture through a compacting and a granulation process, in mixing with small amounts of solid organic additives and in further working up to sintered bodies of low density. The disadvantages are the cost of the production of granules and the attendant necessary additional protective measures, especially in the working up of plutonium oxide.

By addition of larger amounts of foreign product additives to the normally sinterable oxides or mixtures a special dewaxing step before sintering is necessary. During the dewaxing process the foreign product additives leave behind non-shrinking pores, which limit the resulting density of the following sintering process. The moderating action of the additives connected therewith requires a nuclear safe amount. This, as well as the additional dewaxing step greatly increased the price of the process.

It is also known that coprecipitating ammonium diuranate-plutonium hydroxide, mixed in small amounts with normal sintered oxides of uranium and/or plutonium, lowers the density of the sintered materials. Also it is known to use Pu(OH)₄ as a binding agent to Pu containing ceramic fuel materials. The disadvantage of these processes is likewise the criticality of the thereby occurring limit of the amount of usable material through moderation. The quality of the coprecipitated product can vary, furthermore, the product must almost always be comminuted.

It has now been found that 2 to 10% by weight of ammonium uranyl carbonate (so-called "AUC") from wet chemical precipitation admixed as a crystalline, dry powder with the dry oxide or oxide mixtures of normal sinterable quality strongly reduces the sintered density of uranium dioxide or mixtures of uranium dioxide as the major component with plutonium dioxide or thorium dioxide. Through decomposition of the AUC during sintering arise according to the particle size of the AUC pores which are surrounded by fuel material crystallites of normal microstructure and therefore the pores prevent further sintering and shrinking also at high temperatures over 1600° C. and up to 1800° C. and under different sintering atmospheres (for example hydrogen and the so-called forming gas consisting of hydrogen and nitrogen). These large pores are surrounded by relatively pore poor microstructures. This sintered body is characterized by the fact that it is nearly impossible to further densify it by another sintering process.

The AUC usually has a particle size between 100 and 5 millimicrons.

The uranium dioxide powder has a particle size between 50 and 0.1 millimicrons.

The process of the present invention has the following advantages:

(a) AUC is the automatically resulting largely constant well running intermediate product during the conversion, for example, of UF₆ or uranyl nitrate via the carbonate phase to oxide of constantly good sinter qualities. Also it is not necessary to specially produce the AUC.

(b) Since the dry AUC is mixed with the oxide or oxide mixture a limiting of the amount of the mixture through moderation does not occur.

(c) The dry mixability of the AUC with the oxide or mixture of oxides is good. The AUC crystals in contrast to coprecipitation include no foreign material and are not hydroscopic. Likewise the pressing behavior of these AUC oxide mixtures is excellent, for example without or with only small amounts of organic additives, so that an additional dewaxing step is not necessary.

(d) From the good dry mixability of the AUC with the oxide or oxide mixture there results a very uniform pore distribution in the sintered material.

(e) Through mixing of special sieve fractions of the AUC, e.g. 20 to 30 micron particle size there can be attained a desired pore size or pore size distribution in the sintered materials. A comminution of the AUC is normally not necessary since its grain size distribution contains the at times desired special sieve fraction.

(f) The dense microstructure permeated with pores of the desired size has favorable properties regarding the radiation behavior (for example, so-called "swelling," heat conductivity, hardly noticeable after sintering).

Furthermore, it has turned out the compounds uranyl peroxide, uranium IV oxalate, uranyl acetate and, although foreign products, also for example ammonium bicarbonate and hexamethylenetetramine, likewise in small amounts between 2 and 10% by weight dry mixed with the dry oxide or mixture of oxides of normal sintering quality in like manner lower the sintered density through the referred to pore formation. The named compounds produce no poisons in the neutron physical sense. An additional dewaxing step is eliminated as in the use of AUC. The advantages described for the use of AUC addition are largely valid and analogous for these compounds also. Characteristic of the named compounds is their lower decomposition temperature, <600° C.

The invention includes additional chemical compounds of lower decomposition than <600° C. obvious to those skilled in the art, through whose addition the sintered density can be varied without an addition dewaxing step.

The use of AUC is preferred. When plutonium dioxide and/or thorium dioxide are employed with the uranium dioxide they are employed in an amount of 1 to 10% by weight.

Unless otherwise indicated all parts and percentages are by weight.

EXAMPLE 1

$UO_2$ powder of normal sintering quality was dry mixed with ammonium uranyl carbonate powder (AUC) that have been sieved to <20 μm. The oversize grains can either be comminuted and likewise be sieved or can be returned to the $UF_6$-$UO_2$-conversion process. The $UO_2$-AUC mixture, for example containing 4% AUC became jointly, for example dry pressed to tablets by means of a lubricated compression mold and jointly sintered in a sintering furnace under a hydrogen (or hydrogen-nitrogen mixture) atmosphere. The sintering temperature was 1650° C., the time of sintering 2 hours. The speed of heating can be at 400–600° C. per hour. According to the amount of AUC chosen and to the used AUC-sieve fraction sintered bodies resulted with normally developed dense microstructure which are permeated with large pores, which in the Example 1 resulted in a lower density between 87 and 90% of the theoretical density.

EXAMPLE 2

$UO_2$ powder of normal sintering quality was mixed with 20 weight percent plutonium dioxide. Then ammonium-uranyl-carbonate-powder (AUC) was added to the $UO_2$-$PuO_2$-mixture, so that the AUC-amount was 5%. The particle size of the AUC was 20–30 μm. After pressing in a lubricated mold the cylindrical bodies were sintered in a batch-type sintering furnace with an atmosphere consisting of a mixture of 8 percent by volume hydrogen and 92 percent by volume nitrogen. The sintering temperature was 1700° C., the sintering time 3 hours. The heating rate was 600° C. per hour. The resulting sintered bodies had a density of 85% theoretical density, a good pore-size-distribution and an average pore-size-diameter of about 15–30 μm.

Uranyl peroxide, uranium IV oxalate and uranyl acetate are all compounds of nuclear fuel or breeder materials which decompose in the sintering process to manufacturing oxide fuel bodies. In general the decomposable compound should be one which leaves no residue which gives a high parasitic neutron capture cross-section.

EXAMPLE 3

Uranium powder of normal sintering quality was dry mixed with 3 weight percent uranium IV oxalate (sieve-size <32 μm.), pressed to bodies and sintered under pure hydrogen atmosphere and a heating rate of 400° C. per hour up to 1700° C. The resulting sintered body had a density of 90% theoretical density and a good pore-distribution with a pore size in the range of the above mentioned sieve size.

What is claimed is:

1. A process for the production of ceramic oxide sintered materials from uranium dioxide comprising dry mixing with (1) uranium dioxide powder or (2) powdery mixtures of uranium dioxide with (a) plutonium dioxide or (b) thorium dioxide, a powder of predetermined particle size distribution of a compound decomposable at temperatures up to 600° C. selected from the group consisting of uranyl peroxide, uranyl IV oxalate, uranyl acetate, ammonium uranyl carbonate, ammonium bicarbonate and hexamethylene tetramine and forming sintered materials therefrom at a temperature of at least 1600° C., said sintered materials having a density of not over 92% theoretical.

2. A process according to claim 1 wherein the powdered compounds have a particle size of 5 to 100 millimicrons to give the desired pore size and pore distribution.

3. A process according to claim 2 in which compounds of (1) nuclear fuel or breeder materials are added as the decomposable powder which decompose in the process to the production of nuclear fuel and breeder material oxides.

4. A process according to claim 3 wherein the decomposable powder is selected from the group consisting of uranyl peroxide, uranium IV oxalate and uranyl acetate.

5. A process according to claim 2 wherein the decomposable powder is ammonium uranyl carbonate.

6. A process according to claim 1 wherein the decomposable powder is ammonium uranyl carbonate.

7. A process according to claim 6 wherein 2 to 10% of the mixture is the ammonium uranyl carbonate.

8. A process according to claim 1 wherein 2 to 10% of the mixture is the decomposable compound.

9. A process according to claim 1 wherein said sintered materials have a density of 85–92% theoretical.

10. A process according to claim 1 wherein there is employed either (1) uranium dioxide powder or (2) a powdery mixture of uranium dioxide with 1 to 20% of (a) plutonium dioxide or (b) thorium dioxide.

11. A process according to claim 10 wherein the amount of compound decomposable at temperatures up to 600° C. is 2 to 10% of the mixture.

12. A process according to claim 11 wherein there is employed (1) uranium oxide powder.

References Cited

UNITED STATES PATENTS

| | | | |
|---|---|---|---|
| 3,141,782 | 7/1964 | Livey et al. | 264—.5 X |
| 3,168,601 | 2/1965 | St. Pierre | 264—.5 |
| 3,213,032 | 10/1965 | Hammond | 252—301.1 |
| 3,230,278 | 1/1966 | Bauschmann | 264—.5 |
| 3,291,869 | 12/1966 | St. Pierre | 264—.5 |
| 3,342,562 | 9/1967 | St. Pierre | 252—301.1 X |
| 3,344,081 | 9/1967 | Elyard et al. | 252—301.1 |
| 3,398,098 | 8/1968 | Hanson | 252—301.1 |
| 3,431,329 | 3/1969 | White et al. | 252—301.1 X |
| 3,342,744 | 9/1967 | Elyard et al. | 264—.5 X |
| 3,518,065 | 6/1970 | Triggiani et al. | 23—355 |

LELAND A. SEBASTIAN, Primary Examiner

U.S. Cl. X.R.

176—67; 252—301.1 R